Feb. 9, 1965 J. GOLD ETAL 3,168,951
PRODUCT STORAGE MEANS FOR VENDING MACHINES
Filed Dec. 18, 1962 5 Sheets-Sheet 1

JOSEPH GOLD
MARK LEVINE
INVENTORS.

BY

ATTORNEY

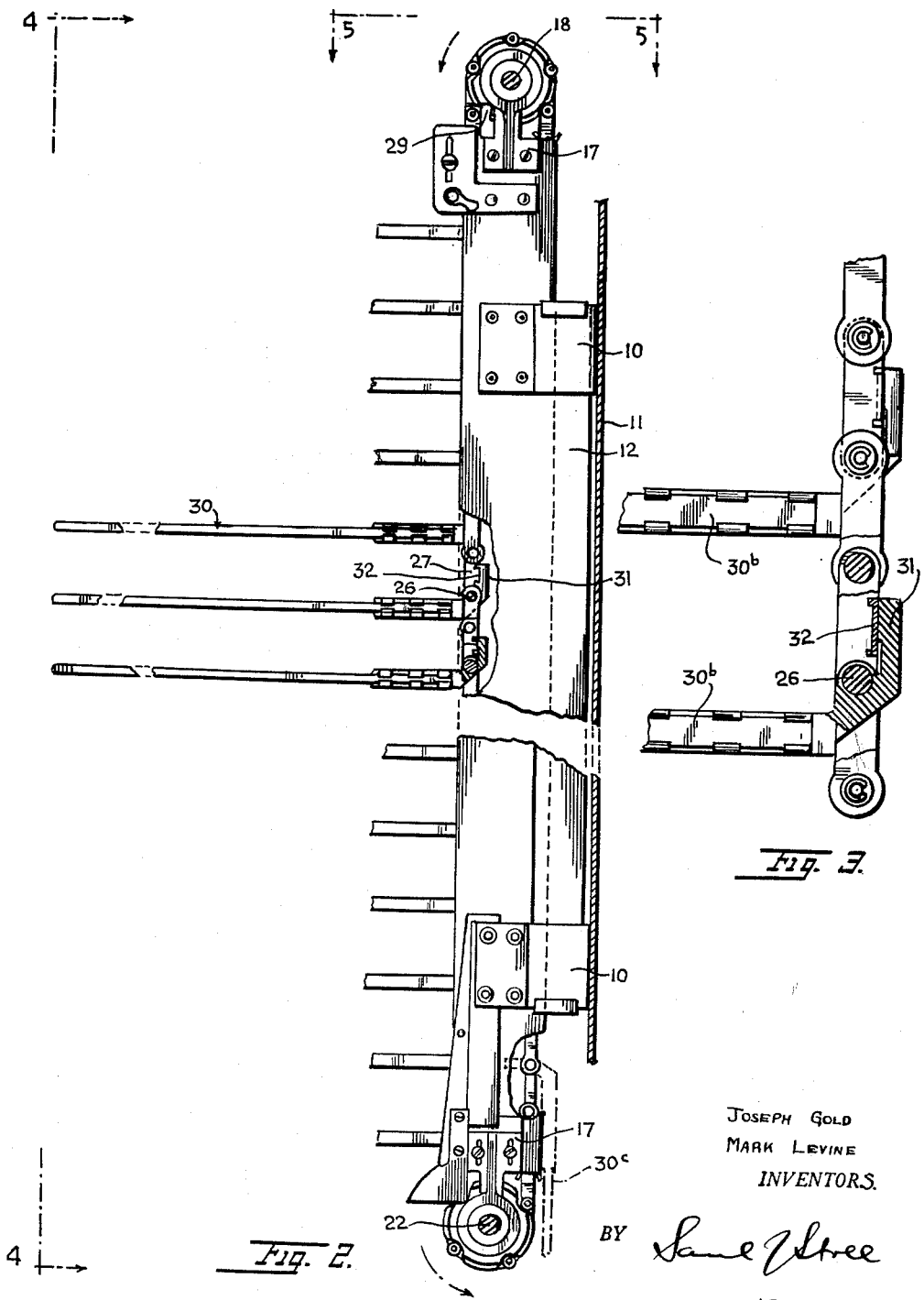

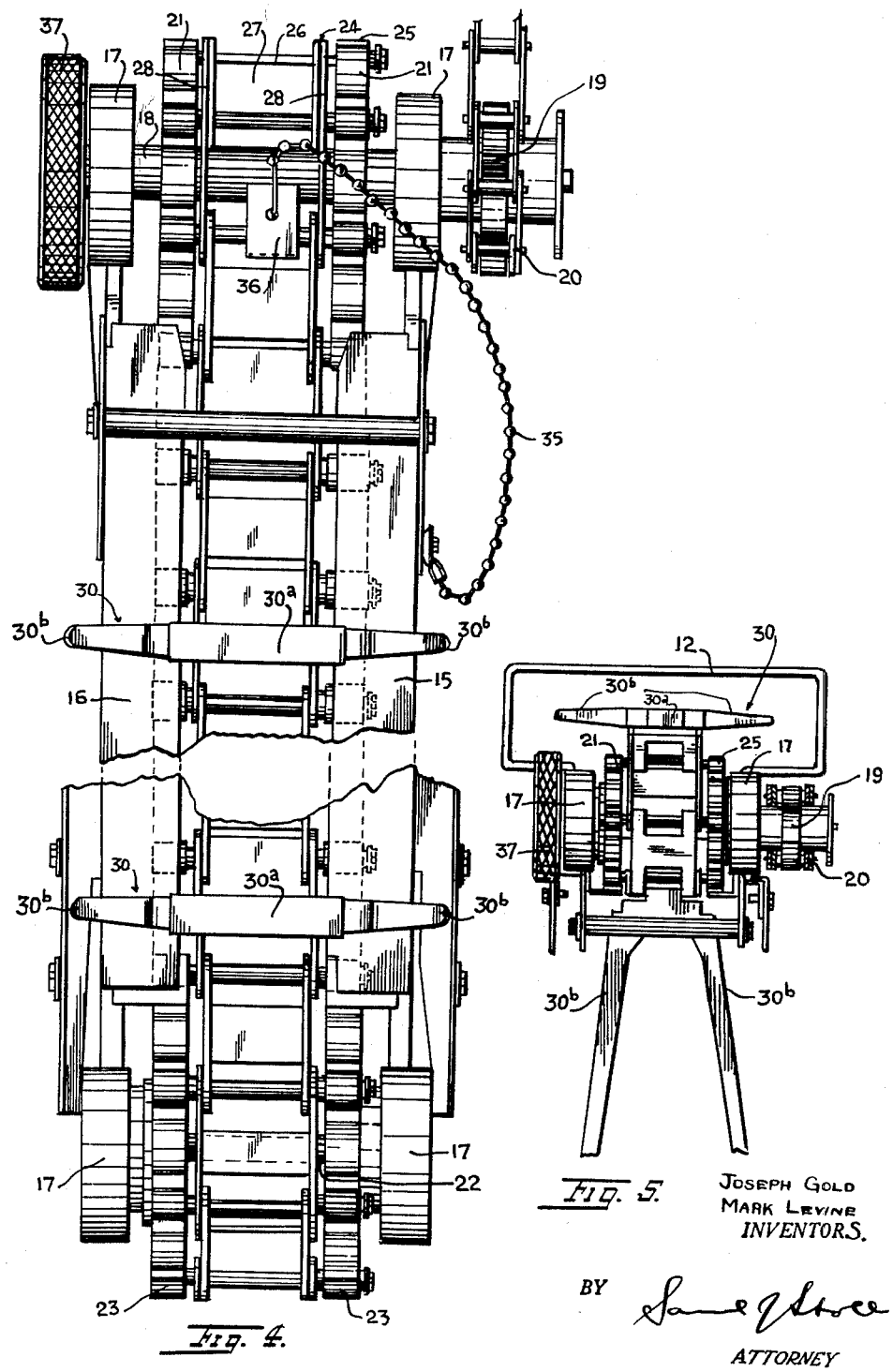

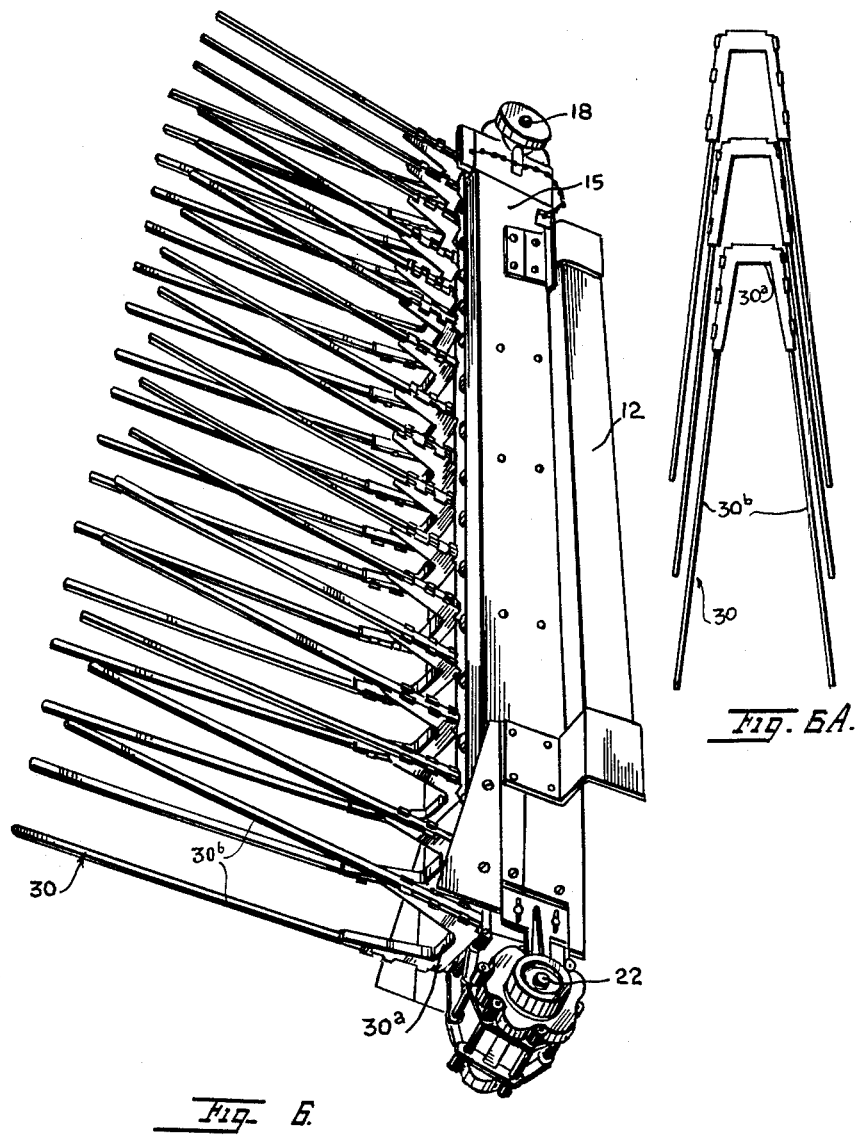

Feb. 9, 1965　　　　J. GOLD ETAL　　　　3,168,951
PRODUCT STORAGE MEANS FOR VENDING MACHINES
Filed Dec. 18, 1962　　　　　　　　　　　5 Sheets-Sheet 5

JOSEPH GOLD
MARK LEVINE
INVENTORS.

BY *[signature]*

ATTORNEY

United States Patent Office 3,168,951
Patented Feb. 9, 1965

3,168,951
PRODUCT STORAGE MEANS FOR VENDING MACHINES
Joseph Gold, Old Bethpage, and Mark Levine, Bethpage, N.Y., assignors to Continental Vending Machine Corp., Westbury, N.Y.
Filed Dec. 18, 1962, Ser. No. 245,492
8 Claims. (Cl. 198—155)

This invention relates to product storage means and, more particularly, means for storing hot and cold food products and other articles in coin-actuated vending machines.

One of the major problems in hot food vending machines is quick, even and thorough heating of the food. When the food packages are stacked contiguously and heat is applied to the outer surface areas, the exposed outside portions heat slowly while the inside and contiguous portions remain relatively insulated from the heat source and retain the cold. Forced circulation of the heating medium (heated air) removes the relatively cool air which circulates the contiguously stacked food packages, and replaces it with heated air, but the heating process is not substantially accelerated thereby. The serving temperature is approximately 160° Fahrenheit. The original storage temperature (prior to stocking in the vending machine) is approximately 0° Fahrenheit. Raising the temperature of contiguously stacked food packages from 0° to 160° Fahrenheit requires a substantial quantity of heat, and a considerable period of time.

An analogous problem is encountered with refrigerated food products which are contiguously stacked. Refrigerated air is circulated around the stacked food packages, but the benefit thereof is derived mainly or, at least initially, by the outer surface portions of the packages. The inner portion thereof, including the contiguously disposed surfaces, remain relatively insulated from the refrigerated air. Consequently, though the present invention will be described mainly in terms of hot food products and means for heating same, it will be understood that the general principles of the invention are equally applicable to cold and refrigerated food products. It will also be understood from the description of this invention that a major advantage thereof resides in the manner in which the product storage means collapses or retracts into nesting relationship when not in use. This feature is extremely valuable, irrespective of the type or nature of the products which the vending machine dispenses. It is therefore essential to point out once again that the invention is not limited in its application to hot food product vending machines, but may equally as well be applied to machines which vend many different kinds of products, and especially those which require constant predetermined orientation.

Storing the individual food packages in such manner as to expose all of their outer surface areas to the circulating heated or refrigerated air can severely restrict the capacity of the vending machine. With specific reference to hot food vending machines, this could seriously reduce the effective capacity of the heating chamber or oven. Individual packages of cooked food, for example platters of food, cannot be dropped down a chute or onto a tray for delivery, as is conventionally done with packages of cigarettes or packaged candies. The individual packages of cooked food must either be removed manually directly from individual receptacles, or else moved mechanically into horizontal alignment with a delivery tray for horizontal mechanical ejection thereon. Stacking such food packages on shelves and moving the individual shelves into alignment with a delivery tray has heretofore severely limited the effective capacity of vending machine heating ovens.

One object of this invention is the provision of product storage means of the character described which supports the individual food packages in spaced relation to expose substantially their entire outer surfaces to a heating medium. More particularly, the food packages are supported on open-frame shelves, preferably of fork-shape. There are no walls to support or confine the food packages, and hence no obstruction (except for the narrow fork elements) to exposure to the heating medium.

Another object of this invention is the provision of mechanical means for moving said open-frame shelves and the food packages which they support to delivery position, such movement being in vertical direction, the food packages being at all times maintained in horizontal position to prevent spillage.

Although this is no part of the present invention, ejecting means may be provided for horizontally ejecting the individual food packages from their respective open-frame shelves onto a horizontally aligned delivery tray. It will, of course, be understood that mechanical ejecting means are not an essential adjunct to the present invention, since the individual food packages may also be manually removed from their respective open-frame shelves. This may be done at a predetermined delivery station to which the apparatus of the present invention would individually move the food packages.

A further object of this invention is the provision of open-frame shelves of the character described which automatically swing from their horizontal food package holding position to vertical shelf-storing position following removal of the food packages which they respectively support. It will of course be understood that in their respective vertical positions, the open-frame shelves occupy substantially less space than in their horizontal outwardly extending positions.

A corollary object of the invention is the provision of open-frame, fork-shaped food package supporting shelves wherein the prongs or arms of the forks are disposed in outwardly diverging relationship. This permits of nesting one fork within the other when disposed vertically in storage position.

An inherent advantage of the features hereinabove described resides in the fact that a plurality of product storage means of the character herein described and claimed may be installed in a single vending machine and, more particularly, in a single heating oven within such machine. In one embodiment of the present invention, there are three such product storage means disposed side-by-side in a single heating oven, each operating independently of the others, each moving its respective open-frame shelves vertically downwardly to dispensing location.

Another advantageous feature of the present invention resides in the fact that each group of open-frame shelves and the mechanism which supports and moves them comprises a self-contained assembly or cartridge which may be installed, removed or replaced as a unit. The advantage of this feature in connection with original equipment installation as well as service in the field will be apparent.

The invention is illustrated in the accompanying drawing in which:

FIGURE 2 is a side fragmentary view, partly in section, of one of said product storage units, said view being taken on the line 2—2 of FIGURE 1.

FIGURE 3 is an enlarged fragmentary view, partly in section, of the open-frame shelf construction of FIGURE 2.

FIGURE 4 is an enlarged fragmentary front view of one of said product storage units.

FIGURE 5 is a fragmentary top view thereof.

FIGURE 6 is a perspective view of one of said product storage units.

Figure 1:
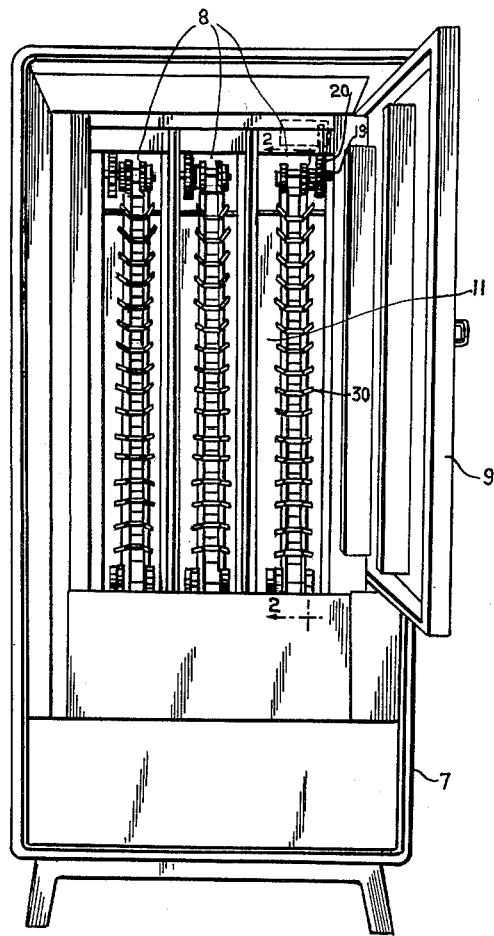
FIGURE 1 is a front view of an open hot food vending machine in which three product storage units, as herein described and claimed, are installed in side-by-side relationship.

Referring now to the details of the invention as illustrated in the accompanying drawing, it will be observed that a typical vending machine to which the present invention may be applied is hot food vending machine 7 shown in FIGURE 1 of the drawing. This machine is provided with three product storage units 8 embodying the features of this invention. As will be observed, these units are disposed in side-by-side relationship, being disposed in vertical position substantially the full length of the heating oven. Front door 9 of the vending machine cabinet is shown in open position to expose the product storage units. It will, of course, be understood that the door is provided with one or more windows through which said product storage units may be viewed when the door is closed.

The back wall of the oven is shown in FIGURE 2 of the drawing and it bears the reference numeral 11. Secured thereto are upper and lower mounting brackets 10, and supported by said brackets are a vertically extending channel 12 and side guide plates 15 and 16. Bracket elements 17, including bearing elements supported thereby, are secured to the upper and lower ends of guide plates 15 and 16, and having two such bracket elements at each end of the assembly. Supported by said bracket elements 17, and more particularly their bearing components, are upper and lower shafts 18 and 22, respectively, these shafts being disposed in parallel relationship on horizontal axes in substantially the same vertical plane. As will be understood from FIGURE 1 of the drawing, these shafts extend transversely of the vending machine cabinet, one located at the upper end of the heating oven, and the other adjacent its lower end.

Figure 7:
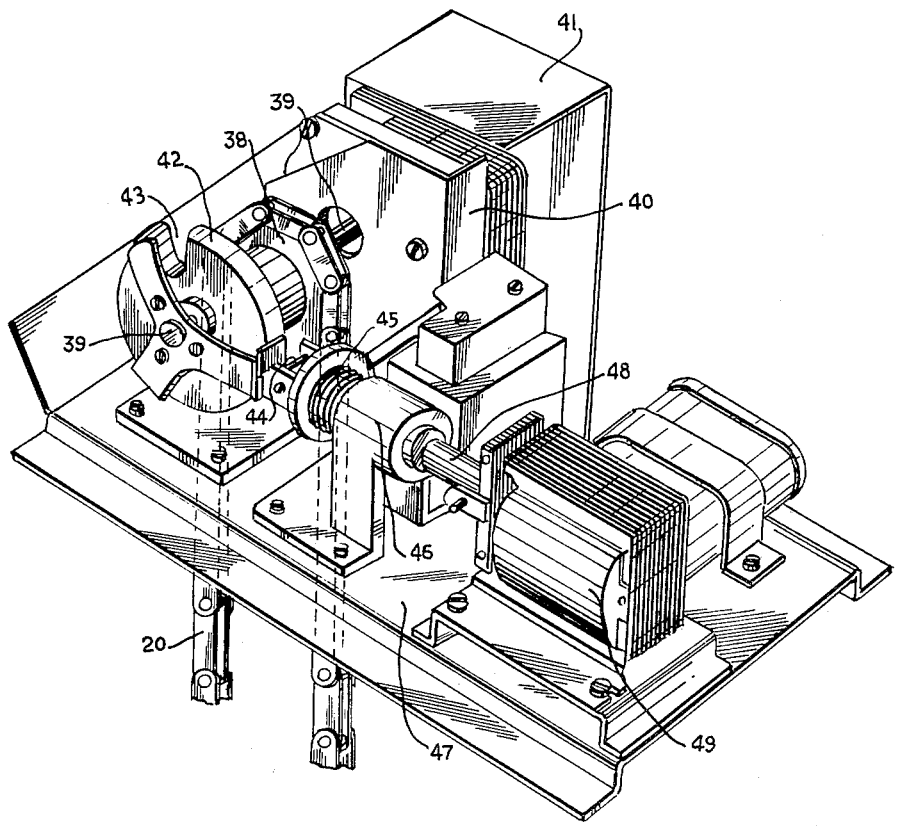
FIGURE 7 is a perspective view of the drive mechanism which operates said product storage unit.

A sprocket wheel or its equivalent is secured to the upper shaft 18, and said sprocket wheel is connected by means of a drive chain 20 to the drive mechanism which is shown in detail in FIGURE 7 of the drawing. Said drive mechanism will shortly be described, but it should be understood at this point that, by reason of said drive mechanism, drive chain 20 and sprocket wheel 19, the upper shaft 18 becomes and serves as the drive shaft of the unit, lower shaft 22 functioning solely as an idler.

Secured to upper drive shaft 18 is a pair of sprocket wheels 21, and mounted on the lower idler shaft 22 is a corresponding pair of sprocket wheels 23. Mounted on these upper and lower sprocket wheels is a pair of endless chains 24 which consist of a plurality of transverse pins 26 which are interconnected by means of connecting links 28. Rollers 25 are rotatably mounted on the ends of pins 26 and are spaced apart by the shelf support links 27. As will appear from the drawing, the spacing of pins 26 is such that rollers 25 are adapted to engage the sprocket wheels 21 and 23 in the successive spaces 29 between their respective teeth. It will now appear particularly from FIGURE 2 that the invention provides a conveyor mounted on a vertically extending frame and having two vertical runs or flights, the front run being in downward direction as indicated by the curved arrows in FIGURE 2, the rear run being in upward direction.

Referring now to the product supporting action of the present invention, it will be observed that mounted on the conveyor is a plurality of open-frame shelves 30. These shelves are pivotally mounted on cross pins 26 as FIGURES 2 and 3 clearly show. It will also be noted that these shelves are fork-shaped in plan view, each fork comprising a yoke portion 30a and a pair of forwardly extending, outwardly diverging arms 30b. In side view, these shelves define a bell crank, one arm or component thereof being fork 30b abovementioned, and the other arm or component being a projecting element 31 which is disposed at an angle of approximately 90 degrees with respect to said fork. See FIGURE 3.

It will be observed that when the shelves are on the downward run of the conveyor, they are disposed in operative position, that is, their fork elements extending horizontally and adapted to support the packages which are to be vended. When the fork elements are in horizontal position, projecting elements 31 extend vertically upwardly, and it will be observed that their forward faces engage a cross member or abutment 32 on shelf support link 27. The pivotal axis of the shelves is located between their respective fork elements 30b and their upwardly projecting elements 31. This too is apparent from FIGURES 2 and 3. It will of course be understood that the weight of the forks and the load which they carry exert a counter-clockwise directed force upon the shelves, about their respective axes, maintaining upwardly projecting elements 31 in engagement with abutments 32, and the fork elements are thereby supported in operative horizontal position.

In the operation of the present device, open-frame shelves 30 are moved intermittently downwardly on the forward and downward run of the conveyor, and as each shelf reaches its lowermost horizontal position thereon, the product which it supports is removed therefrom and vended. Further movement of the conveyor in the same direction will cause the empty shelves to move downwardly and arcuately around the lower sprocket wheels 23. At a given point, the shelves and more particularly their fork elements will hang vertically downwardly from the conveyor pins which respectively support them. Projecting elements 31 will disengage conveyor abutments 32 and the result is that the shelves will hang freely, one above the other, as they move upwardly, being carried by the upward run of the conveyor. This is clearly shown in FIGURE 2, wherein a downwardly hanging shelf is represented by interrupted lines 30c. It will thus appear that gravity plays a key role in both the operative and inoperative positions of the shelves, maintaining them in these positions, and swinging them from the former position to the latter as the shelves move from the downward to the upward run of the conveyor.

It will further be noted that as the several shelves assume a vertical position on the upward run of the conveyor, they are drawn upwardly into channel 12. This appears in FIGURE 5 of the drawing. It will now be understood that in order for these shelves to assume their respective vertical positions, one above the other, it is necessary for them to enter into nested relationship. This is achieved by reason of the diverging relationship of their respective arms, each said shelf nesting between the arms of the next succeeding shelf above it.

The action of the converter mechanism thus far described is as follows: At the outset, all the shelves are positioned on the downward run of the conveyor, as illustrated in FIGURE 2. The shelves are then loaded with the products which are to be vended and the machine is put into operative condition. The first product to be vended is the one which is supported on the lowermost shelf. The remaining products are vended in the order in which they reach the position of said lowermost shelf. When the last product is vended, this being the product located on the shelf which originally was the uppermost shelf of the group, most of the shelves will be situated in hanging positions on the upper run of the conveyor within channel 12. A travel limiting chain 35 limits the downward movement of the downward run of the conveyor, said limiting chain being connected at one end to the stationary frame of the conveyor, the opposite end of the chain being connected to a plate or bracket 36 on one of the cross pins of the conveyor. In order to reload the shelves, it is necessary to reverse the direction of movement of the conveyor and to return the shelves to their respective horizontal positions on the downward run, as illustrated in FIGURE 2. This may be done in various ways, one way being manual and, more particularly, manual rotation of knob 37 on shaft 18.

The drive mechanism of the conveyor is shown in FIGURE 7. It comprises drive chain 20 which engages sprocket wheel 19, a second sprocket wheel 38, the shaft 39 on which said sprocket wheel 38 is mounted, a speed reducing gear box 40 and an electric motor 41 connected thereto. This is a simple motorized drive mechanism which is illustrative of the many different kinds of drive mechanism which may be used in connection with the present invention. The circuitry which is connected to motor 41 is not shown, since it forms no part of the present invention, and this is also true of the circuitry which is connected to the solenoid actuated locking mechanism hereinafter described.

It will be understood that the intermittent conveyor movement is in increments corresponding to the spacing between shelves. This movement must be indexed in order to assure registration of each successive shelf with the product delivery means and station. This is achieved by the following mechanism: A notched wheel 42 is secured to the same shaft 39 on which sprocket wheel 38 is mounted. The notches 43 in said notched wheel are spaced predetermined angular distances apart. Engageable with these notches is a bolt 44 which is spring-urged into engagement therewith by means of coiled compression spring 45. The bolt is axially slidably mounted in a bushed bracket 46, this bracket being secured to a fixed frame 47 of the vending machine. Connected to bolt 44 is plunger 48 of solenoid 49. The action of the solenoid and that of the spring are opposed to each other.

When a product is purchased, the conveyor is caused to move to the extent of one increment of travel, this distance being sufficient to move the lowermost product-supporting shelf into delivery position. However, before the conveyor is permitted to travel this distance, locking bolt 44 must be retracted and disengaged from notched wheel 42. This is done by the solenoid, and the conveyor is now free to move. The solenoid is then deenergized, and the bolt is spring-urged forwardly into reengagement with the notched wheel. It will, of course, enter the next notch which registers therewith, and this will stop the conveyor at precisely the right time and place.

The foregoing is illustrative of a preferred form of this invention and it will be understood that this form may be modified and other forms may be provided within the broad spirit of the invention, and the broad scope of the claims.

What is claimed is:

1. Product storage means for vending machines, comprising a conveyor having downward and upward runs and open-frame shelves mounted on said conveyor, said shelves extending horizontally from the downward run of the conveyor to support products to be vended and hanging vertically from said upward run following vending of said products, said open-frame shelves being fork-shaped in plan view, the arms of the fork diverging in forward direction to permit of nesting one fork within the other when they hang vertically, one above the other, from the upward run of the conveyor.

2. Product storage means in accordance with claim 1, wherein the downward run of the conveyor is situated forward of the upward run, the shelves mounted on said downward run projecting frontwardly.

3. Product storage means in accordance with claim 1, wherein the conveyor comprises a vertically extending frame, a pair of horizontally spaced, axially aligned sprocket wheels mounted at the upper end of said frame, a second pair of horizontally spaced, axially aligned sprocket wheels mounted at the lower end of said frame, a pair of endless chains mounted on said upper and lower pairs of sprocket wheels, and a drive mechanism connected to one of said pairs of sprocket wheels.

4. Product storage means in accordance with claim 3, wherein the driven sprocket wheels are mounted on a common shaft, said drive mechanism comprising a motor driven chain drive connected to said common shaft.

5. Product storage means in accordance with claim 4, wherein intermittent locking means are connected to said chain drive, said locking means comprising a locking wheel, notches formed in said locking wheel in predetermined spaced relationship, a bolt spring-urged into locking engagement with said notches, and a solenoid connected to said bolt to retract it from locking engagement with the notches against the action of the spring.

6. Product storage means in accordance with claim 1, wherein the shelves are pivotally mounted on the conveyor, shelf latching means being provided between the shelves and the conveyor, said latching means being operative when the shelves are on the downward run of the conveyor to support them in horizontal position, said latching means being inoperative when the shelves are on the upward run of the conveyor to permit the shelves to hang vertically therefrom.

7. Product storage means in accordance with claim 6, wherein the shelf latching means comprises an abutment on the conveyor adjacent each shelf and a projecting element on each said shelf which is oriented for engagement with said abutment when the shelf is on the downward run of the conveyor, said projecting element being disengaged from said abutment on the upward run of the conveyor.

8. Product storage means in accordance with claim 7, wherein the shelves define a bell crank in side view, one arm of said bell crank comprising the product supporting member and extending horizontally when the shelves are on the downward run of the conveyor, the other arm of the bell crank comprising the projecting element of the shelf latching means and extending upwardly into engagement with the abutment of said latching means when the shelves are on said downward run of the conveyor.

References Cited in the file of this patent

UNITED STATES PATENTS

| | | |
|---|---|---|
| 1,212,662 | Meyers | Jan. 16, 1917 |
| 1,876,510 | Morrison | Sept. 6, 1932 |
| 2,390,277 | Simpkins | Dec. 4, 1945 |
| 2,888,165 | Bookout et al. | May 26, 1959 |